C. C. BRADLEY.
Draft Equalizer for Wagons.
No. 83,914. Patented Nov. 10, 1868.
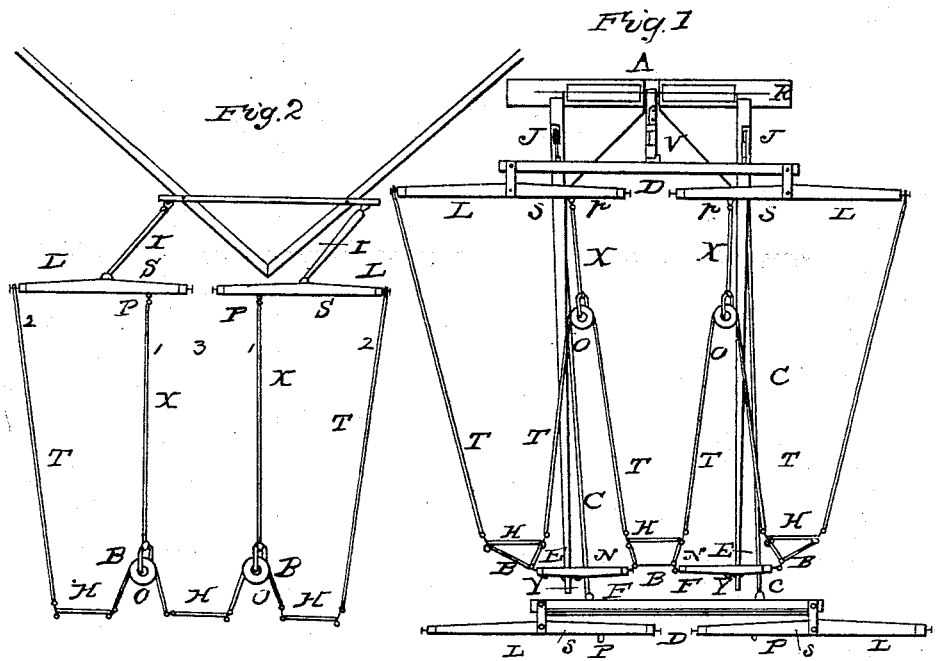
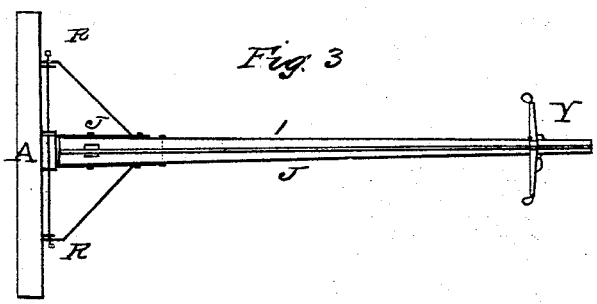
Witnesses
W. H. Bradley
M. L. Bradley.
Inventor
Chs. C. Bradley

CHARLES C. BRADLEY, OF BRODHEAD, WISCONSIN.

Letters Patent No. 83,914, dated November 10, 1868.

IMPROVEMENT IN DRAUGHT-EQUALIZER FOR WAGONS.

The Schedule referred to in these Letters Patent and making part of the same.

*To all whom it may concern:*

Be it known that I, CHARLES C. BRADLEY, of Brodhead, in the county of Green, in the State of Wisconsin, have invented a new and improved Method of Equalizing the Power of Three or Six Animals Harnessed Three Abreast; and I do hereby declare that the following is a full, clear, and exact description thereof, reference being had to the drawings annexed, making a part of this specification, in which—

Figure 1 is a representation of a part of a "vehicle" with the gear for six animals, or so much as is requisite to show the attachments;

Figure 2 is a view of a three-horse gear as attached to a harrow; while

Figure 3 is a view of two vehicle-poles combined in one, to be used with common two-horse gear.

The nature of my invention consists in making a common two-horse gear in such a manner as that three animals may work evenly thereon, harnessed abreast.

To enable others to make and use my invention, I here describe my manner of making and using it.

I make my "whiffle-trees" in the common form, as seen in figs. 1 and 2, L S, and attach the two, as shown in fig. 2, to a "fixed" point, as by the rods I I, to a harrow, without any "double-tree," or to a double-tree of common form, as seen in fig. 1, D.

On the inner arms of the "whiffle-trees" I make an attachment for a trace, as seen at P P, and at *p p*, where the trace-chain X is attached, as shown in fig. 1, which point of attachment is midway on this arm, making the short arms, S S, one-half the length of the long arms, L L.

At the end of the chain X is a pulley, made of a common clevis, seen at O, around which I pass each outside horse's inside trace, and attach it to the middle one's "hames" or "hames-tug," as seen in fig. 1, or I let the chain-trace X pass along further, and use each outside horse's "breast-straps" for the connecting-traces, as seen at B B, fig. 2.

The outside traces are attached, as usual in two-horse-gear, to the longer arms, L L.

There being a half power on each long arm, and a full power on each short arm, there is an equal strain on all the traces T T T T T T, and of course a double traction on the trace X.

In fig. 1, the whiffle-trees are attached to the common double-trees D D, and these double-trees are attached to each other by means of the rod and chains C C, which pass from the rear double-tree over pulleys in the two "poles," as seen at J J, fig. 1, down under said "poles," and thence forward to the "lead-bars," to which it is attached, thus connecting the six animals, so that each animal draws against all his fellows, and each an equal amount.

The strap V is a "stay," when six are used, or a "draught-strap" when only three animals are used.

My "neck-yokes," N N, are made with each a long arm, F, to which the centre animal is geared, and each a short arm, E, to each of which an outside animal is attached, by the "breast-straps," as seen at B B, fig. 1. Breast-straps and traces attached to hames H.

The yokes have an extra pole-ring in the centre, as seen at Y, which adapt them to two horses, applicable to the double pole J J, shown in fig. 3, which poles are connected to an axle, A, by the rod R passing through braces on poles, and "ears" on axle, as in common styles. Each pole changes sides when changed from three to two-horse gear, and *vice versa*.

What I claim as my invention, and desire to secure by Letters Patent, is—

The combination and arrangement of the power-equalizer, consisting of the duplicate poles, and the two whiffle-trees, and two neck-yokes, each with a long and a short arm, and the pulleys attached to the whiffle-trees and poles, for the purposes herein set forth, or substantially the same.

CHS. C. BRADLEY.

Witnesses:
S. P. TAFT,
M. A. BRADLEY.